May 8, 1928.
W. A. BELFIELD
SPIRIT LEVEL TUBE
Filed July 23, 1925
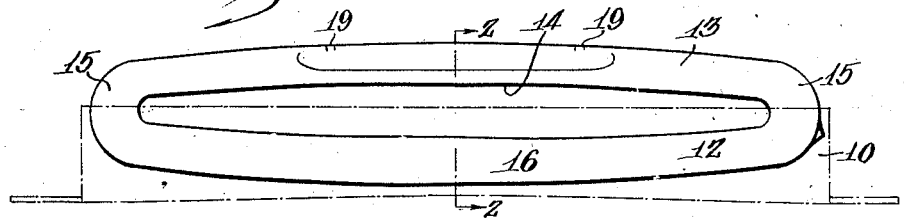
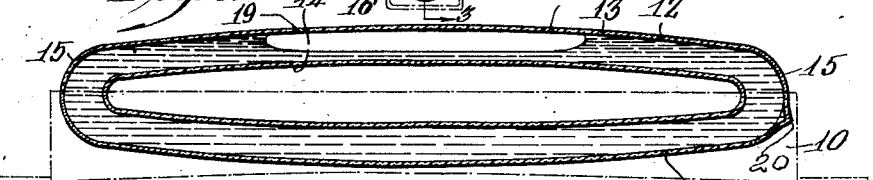
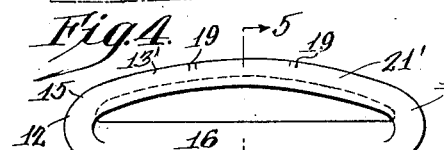
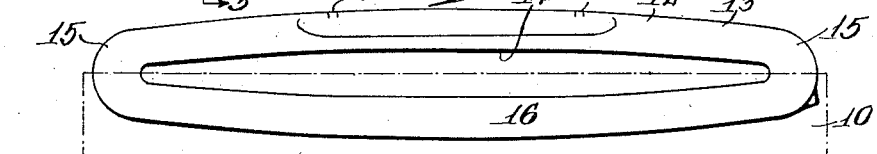
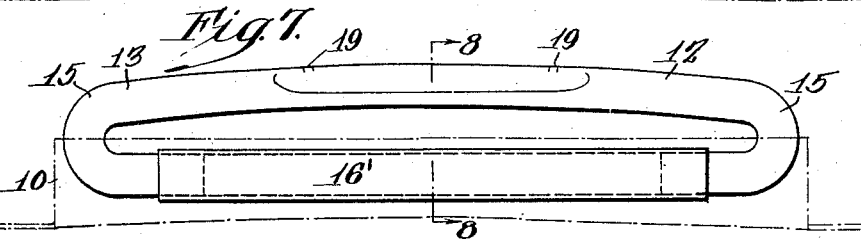
Inventor
William A. Belfield Patented May 8, 1928.

1,669,035

UNITED STATES PATENT OFFICE.

WILLIAM A. BELFIELD, OF PHILADELPHIA, PENNSYLVANIA.

SPIRIT-LEVEL TUBE.

Application filed July 23, 1925. Serial No. 45,586.

My invention relates to levels of the type used by carpenters and mechanics for leveling constructions and upon surveying instruments.

The main purpose of my invention is to provide a relatively flat level with a return passage for liquid in the level.

A further purpose is to have a long bubble in a level of a small tube cross section and to secure great delicacy of movement by joining the ends of the tube to provide a return passage for the liquid.

A further purpose is to secure a relatively flat compact level of great delicacy of movement.

Further purposes will appear in the specification and in the claims.

I prefer to illustrate a number of modifications of one general form only, selecting a form which has proved to be practical, highly efficient and inexpensive and which at the same time well illustrates the principles of my invention.

Figure 1 is a side elevation of a level element ready for insertion in a support shown in dot-dash line.

Figure 2 is a section of Figure 1 taken upon line 2—2.

Figure 3 is a vertical central section of the structure of Figure 1 corresponding to a plane parallel to the paper.

Figure 4 is a side elevation of a modified form.

Figure 5 is a section of Figure 4 taken upon line 5—5.

Figures 6 and 7 are views corresponding to Figure 1 differing slightly in detail.

Figure 8 is a section of Figure 7 taken upon line 8—8.

Figure 9 is a section corresponding to Figures 2, 5 and 8, of a further modified form.

In the drawings similar numerals indicate like parts.

Sensitiveness in a level is within certain limits a function of the curvature of the leveling tube and also of the length of the bubble.

In the past a proper curvature for high sensitiveness has with a long bubble unduly constricted the liquid beneath the middle of the bubble which has tended to retard the bubble in its freedom of movement, thus offsetting to greater or lesser degree the advantage incident to the length of the bubble, which is that of having the bubble ends away from the horizontal mid portion of the tube when in mid position.

I have discovered that the proper relation between curvature of the leveling tube and length of bubble may be maintained without this disadvantageous retardation from restriction of the liquid at the middle of the bubble by connecting together the ends of the nearly flat leveling tube to form a return circuit, and that the return circuit may be kept close enough to the indicating portion of the tube to avoid excessive depth of the complete indicator so that my indicator may be used in almost any location in which the single tube indicator may be used.

This return circuit for a slightly curved indicating tube is particularly advantageous in connection with a long bubble, a long bubble having a depth at its middle that has hitherto restricted the liquid beneath it and prevented freedom of bubble movement; however obviously it is also advantageous with a short bubble but less advantageous than a long bubble.

In the drawings the casing 10 is shown for purpose of completeness of illustration only and the elements presented may be applied to any frame or mount, so that the casing is diagrammatic, as is also the filling 11 by which the leveling tube 12 is firmly mounted within the casing. Any suitable support and mounting may be used.

The level comprises a leveling tube 13 having the slightly curved upper contour 14 and downwardly turned ends 15 which connect with a return tube 16. This return tube is preferably close to the tube 13 in order that the total height of the structure may be low.

For convenience in manufacture it may be desirable to make the return tube 16 of same cross section as the leveling tube 13, as shown in Figure 4. However, the best section for the return tube will depend upon circumstance; any return tube even though its section be very small is of advantage. Generally speaking a fairly large section is desirable in that the return is then most easy and in Figures 2 and 3 I show the return tube with larger cross section than the leveling tube. A sealed filling opening is shown at 20.

The important feature is the return circulation for a nearly straight leveling tube through a passage joining the ends of the tube and the relative sectional sizes of the leveling and return tubes are relatively unimportant; obviously the return passage need not be of glass but may comprise the body of the support as in Figure 7.

The depth of a bubble and constriction of liquid beneath its middle increases with the length of the bubble; using the return tube I am enabled to use a longer and, therefore, deeper bubble than would otherwise be permissible. This is desirable with the nearly flat contour type of level as the restriction of liquid under the middle of the bubble does not retard its freedom of motion, and even in mid-position the ends of the long bubble lie within inclined portions of the leveling tube so that my level with its long bubble and return passage 13 is far more sensitive in mid-position than either a short bubble with a return passage or a long bubble without a return passage.

I suitably mark the central position of the bubble by lines 19 at or near each end of the bubble, properly cut upon the leveling tube.

In Figures 4 and 5 my invention has been accommodated to a level of low total height by having the return bends closely turned and the return tube 16 horizontal. In these figures the middle portion of the leveling tube has been given a flattened arcuate section 21' so as to provide a wide bubble for easy reading.

In Figures 1 to 3 and 6 I show the return tube 16 downwardly concaving. In Figure 9 both sections are oval.

It will be obvious that modifications and changes in my invention will occur to those skilled in the art and that all such as fall within the reasonable spirit and scope of my invention should be included herein.

Having thus described my invention, what I claim as new and desire to secure by Letters Patent is:—

A spirit level tube having slight longitudinal convexity and upwardly convex upper and lower surfaces in transverse section and a return for the tube lying close to the concavity formed in the lower part of the tube to give additional effective diameter to the upper tube and shortness of total height from the top of the upper tube to the bottom of the lower tube or return.

WILLIAM A. BELFIELD.